Feb. 16, 1965 F. G. CONSTANCE ETAL 3,169,572
RADIANT SCREEN BURNER
Filed Dec. 6, 1960 2 Sheets-Sheet 1
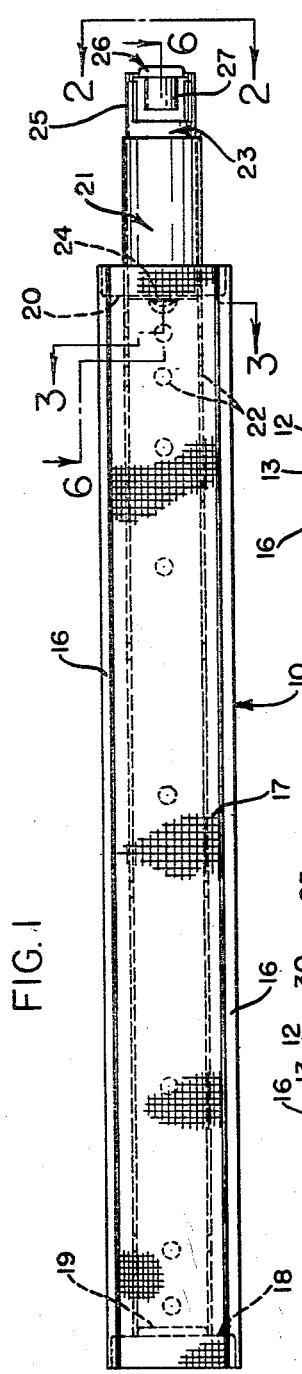
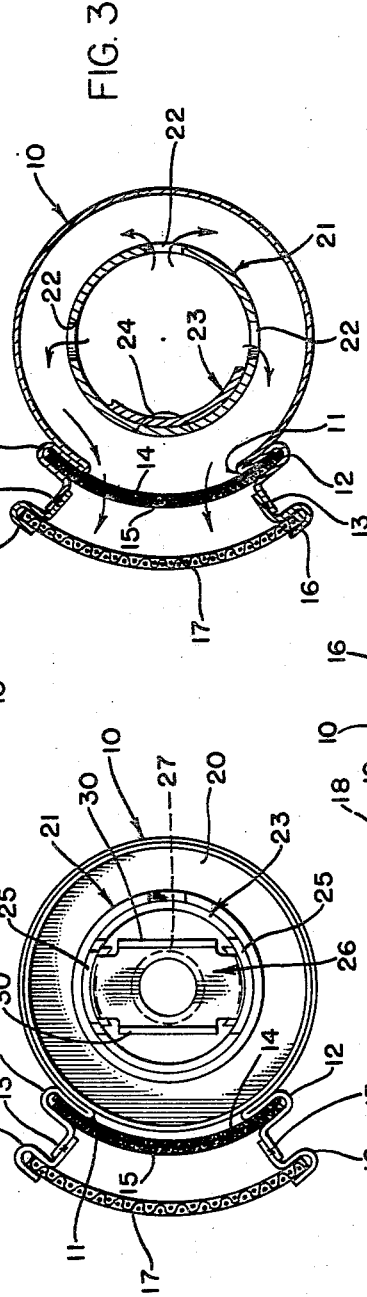
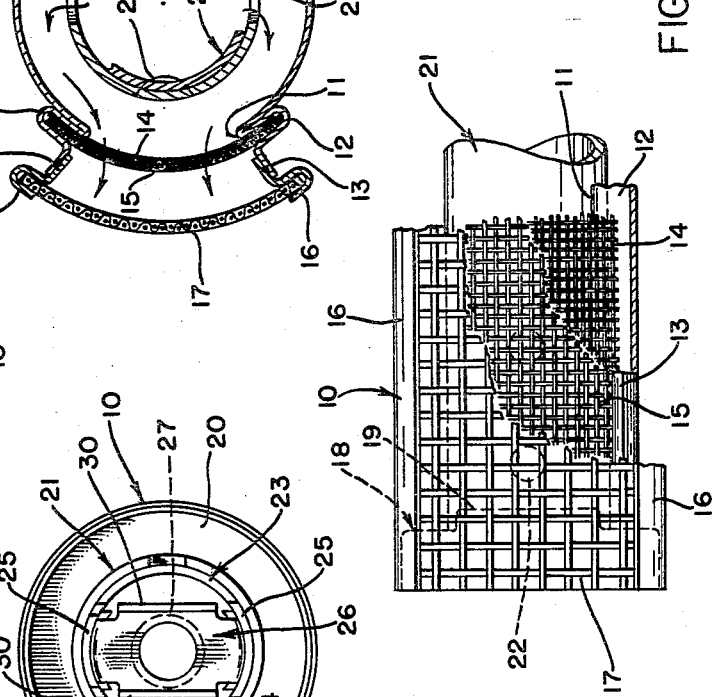
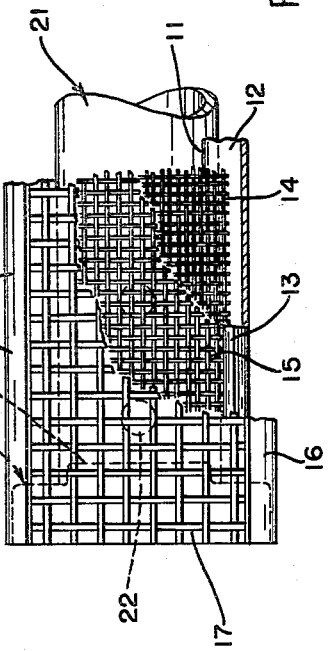
INVENTORS
FREDERICK G. CONSTANCE &
ERWIN C. DALENBERG
BY
Oberlin, Maky & Donnelly
ATTORNEYS

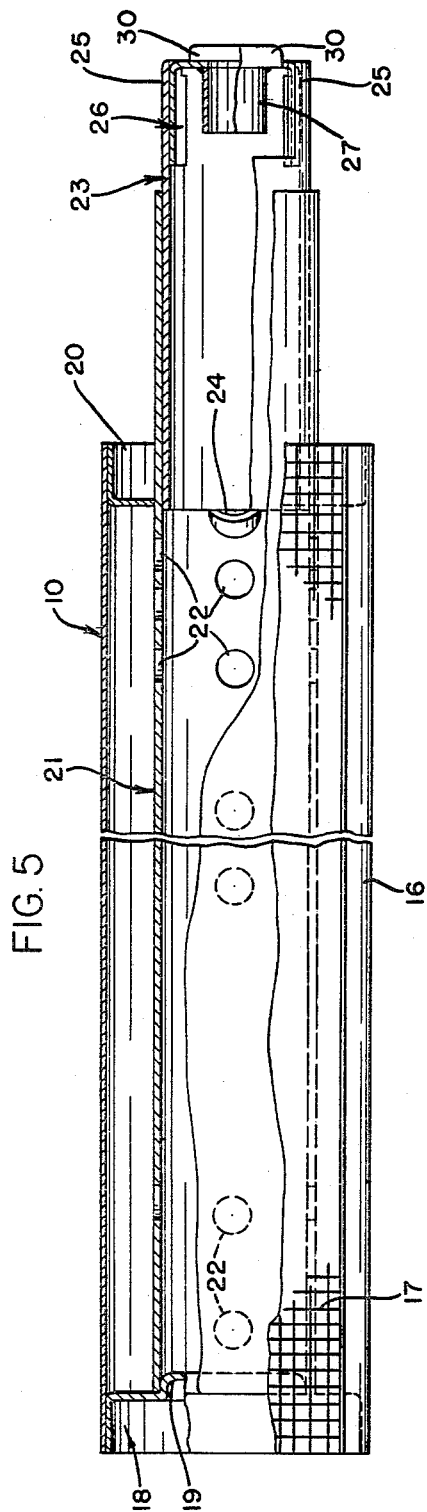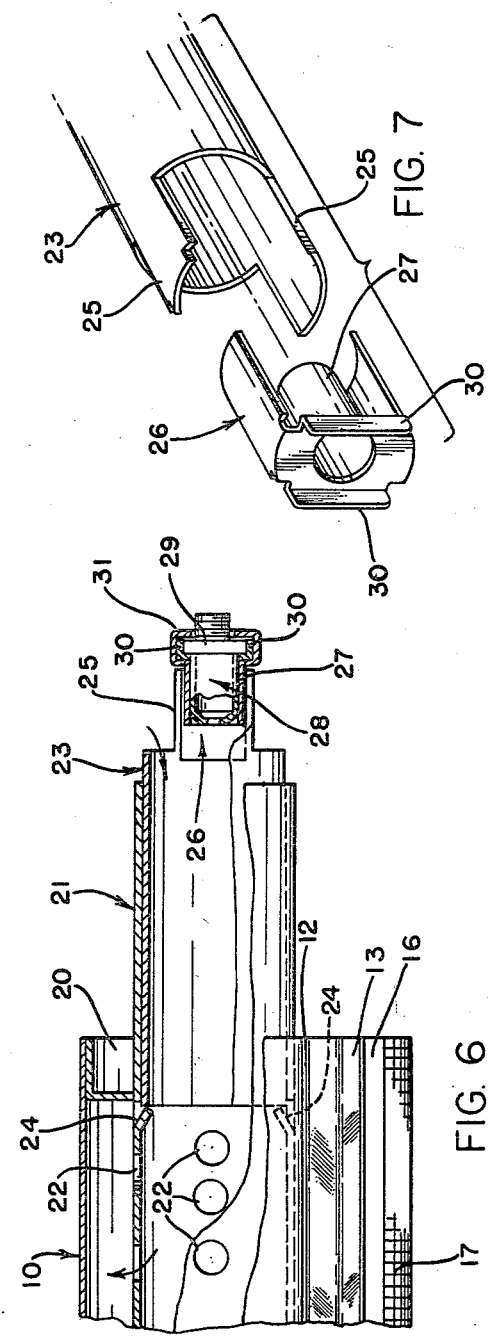

United States Patent Office 3,169,572
Patented Feb. 16, 1965

3,169,572
RADIANT SCREEN BURNER
Frederick G. Constance and Erwin C. Dalenberg, Mansfield, Ohio, assignors to The Tappan Company, Mansfield, Ohio, a corporation of Ohio
Filed Dec. 6, 1960, Ser. No. 74,139
1 Claim. (Cl. 158—116)

The present invention relates to a heating device in which infra-red rays are generated as the result of heating a screen assembly by combustion of gaseous fuel, with such device suitable for use as a broiler burner in a gas cooking range or for more general space heating applications.

Radiant screen burners of this type, regardless of specific details, usually comprise an assembly of several screens respectively serving different but related functions in the combination, with these relationships involving not only the structural characteristics of the screens but the spatial arrangement of the same as well. For example, such screens will generally vary in mesh or the extent to which the same are open and are disposed in a predetermined directional order, such as with reference to the zone of the gaseous fuel supply, and it is important to uniform and efficient operation of the device in the particular intended manner that the established order or spatial relations of the screens be closely maintained. The inevitable expansion and contraction of metallic screens upon heating and cooling of the same can be sufficiently disruptive of these relationships to have an adverse effect on the operation, as evidenced by proposals which have been made to employ special mounting means to accommodate such characteristic action of the screens. It is a primary object of the present invention to eliminate potential disruption of the normal array on such account without the necessity for special screen supports, the use of which of course complicates and very likely adds to the production cost of the device.

It is another principal object of the invention to provide such a heating device having a preferred array or assembly of screens which requires fewer screens than presently available devices of this nature, with a further savings in the cost of manufacture thereby realized, while at the same time the useful life of the assembly is extended and the performance is generally improved.

Another object of the invention is to provide such a device in which a relatively coarse and heavy flame or burner screen can be and is utilized for greater durability and useful life.

It is also an object to provide a radiant screen burner in which the flame or burner screen is supported in such manner as to confine the heat produced thereby and substantially to eliminate flow of relatively cool air to this area, thereby to improve by these measures the operating efficiency of the burner screen.

A further object is to provide such a burner in which the gaseous fuel mixture supplied thereto is uniformly distributed to the burner screen and the construction, moreover, permits the burner to be made in fairly large sizes with the improved operating characteristics thereof maintained.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawings setting forth in detail certain illustrative embodiments of the invention, these being indicative, however, of but a few of the various ways in which the principle of the invention may be employed.

In said annexed drawings:
FIG. 1 is a plan view of a radiant screen burner made in accordance with the present invention, with the screen assembly uppermost and the scale reduced relative to the remaining figures;
FIG. 2 is an end view of the burner, viewed from the right in FIG. 1 as shown by the line 2—2 therein;
FIG. 3 is an intermediate transverse section taken along the line 3—3 in FIG. 1;
FIG. 4 is a fragmentary plan view of the other end portion of the burner;
FIG. 5 is a further broken view of the burner, partially in plan and partially in longitudinal section;
FIG. 6 is a fragmentary longitudinal section the plane of which is indicated by the line 6—6 in FIG. 1; and
FIG. 7 is a perspective view of selected components of the burner.

Referring now to the drawings in detail, the illustrated embodiment of the invention comprises a cylindrical body 10 of considerable length relative to its diameter and having an interruption in the wall thereof which defines a longitudinal slot 11 extending from one end to the other. Such slot is, more particularly, bounded by circumferentially spaced extensions of the body wall which are respectively bent back or away from the slot against the cylindrical wall portions adjoining the same and then reversely in spaced relation to form opposed channels 12 terminating in generally radially directed outer flanges or walls 13.

The side walls of the longitudinal channels 12 are substantially concentric with the body 10 and thus provide arcuate recesses extending along the edges or sides of the slot 11 at a slightly greater radial distance from the common axis. Two curved screens 14 and 15 coextensive with the channels 12 and hence the body are supported over the slot 11 by having their longitudinal edges respectively disposed in the channels. These paired screens are in contact at their respective inner faces as shown and their curvature is such that they are concentric with the body. As will appear more fully below, the innermost screen 14 is a port screen of relatively fine mesh, while the overlying screen 15 is a flame or burner screen of coarser mesh.

A clamp bar 16 of hook shape in section is secured along each projecting flange 13, with the reversely bent portions of the two facing inwardly with regard to the burner body slot and similarly being transversely arcuate for concentricity with the burner body. A further longitudinally extending and transversely curved screen 17 of still coarser mesh is mounted with its sides respectively secured in the clamp bars 16 and the curvature thereof continues or maintains the noted concentric relation. This outer screen, as will also be explained more in detail hereinafter, is referred to as the radiant screen of the assembly.

One end of the body 10 is closed by an imperforate front end cap 18 having a cylindrical inwardly offset central portion 19, while the other end has fitted therein a rear cap 20 in which there is a circular central opening. A gas distributor tube 21 of smaller diameter is mounted coaxially within the body through the opening in the rear cap 20 and with its front end supported on the offset portion 19 of the front cap 18. The length of this tube is such that it extends appreciably beyond the rear end of the burner body 10, and three longitudinally extending rows of holes 22 serve as ports for the tube. As best shown in FIG. 3, these rows are spaced 90° apart, with the middle row diametrically opposite the center of the slot 11 and the major imperforate portion of the tube wall thus adjacent the slot. It will also be seen that the holes or ports 22 in each row are non-uniformly spaced apart longitudinally, such that the holes are spaced fairly close together at the rear end of the burner and the spacing thereof progressively increases toward the opposite or front end.

The components thus far described, that is the burner body, screen assembly, and the distributor tube form a unitary assembly which is removably supported telescopically on a stationary injection tube 23. It will be understood that the latter will be appropriately mounted on a suitable support, not shown, and it will be evident from FIG. 6 in particular that support of the burner body and united components is realized by telescoping the projecting rear end of the the distributor tube 21 over the injection tube. Inner tabs 24 punched in the wall of the distributor tube just inside the rear body cap 20 serve as stops to limit the relative penetration of the injection tube.

The rear end of the stationary injection tube 23 is formed with opposed tongues or extensions 25, and an injection tube bracket 26 is embraced by and secured to such tongues. This bracket carries a spud sleeve 27 on the axis of the injection tube as assembled with the latter, with the length of the sleeve in the assembly being less than the injection tube tongues 25 when the bracket is secured to the same as shown, so that there is an appreciable gap between the outer or rear end of the main body of the injection tube 23 and the inner end of this spud sleeve 27. The tongue formation of the injection tube end and the illustrated general U-shape of the bracket 26 leaves the injection tube end substantially unobstructed or open for the admittance of air.

With particular reference again to FIG. 6, the spud sleeve 27 receives a suitable gas spud as indicated at 28. Such spud is here shown as having an intermediate peripheral projection 29 which fits between rearwardly extending ears 30 of the bracket 26 and is held therein by a spud clip 31 engaged over the spud and around such ears. This clip of course has an opening for passage of the threaded end of the spud 28, and it will be understood that other mounting expedients could as well be employed, the important consideration being the assembly with the spud sleeve which serves to ensure that the supply of the gas fuel is directed to the injection tube and hence the burner along the axis of the assembly.

The injection tube 23 serves as a mixing tube for such fuel supplied through the spud, from a suitable source, and primary air drawn in the substantially open or unobstructed end of the tube. The combustible mixture proceeds to the interior of the distributor tube 21 of the burner and passes through the several ports 22 therein to the surrounding space within the body 10 of the burner, as indicated by the arrows in FIG. 3. The uneven spacing of these ports is designed and effective to maintain the discharge from the distributor tube substantially uniform along the length of the same notwithstanding the drop in the velocity of the flow, that is, the discharge port area is greatest in the initial portion of the distributor tube (with closely spaced holes) at which the flow velocity is highest and decreases, as noted earlier, progressively along the tube or in the direction of the flow. The gas and air mixture flows substantially uniformly then along the length of the distributor tube outwardly through the slot 11 in the burner body 10 where it must pass first through the inner port screen 14.

As also noted previously, the port screen in this assembly is of relatively fine mesh; more particularly, such screen is preferably 30 mesh, made of highly resistant .014 inch diameter wire, and has an open area of 33.5%. It is preferred for this, and the other screens as well, that nickel-steel alloy wire be used. The purpose of the port screen is of course to define a multiplicity of openings or ports for immediate delivery of the combustible mixture to the overlying (contacting) flame or burner screen 15 at which the mixture is ignited in suitable manner.

The burner screen is preferably 12 mesh, with a wire diameter of .025 inch and an open area of 48.4%, while the outer or radiant screen 17 is preferably 8 mesh, with a wire diameter of .041 inch and an open area of 45.2%. In proper operation, the gaseous mixture burns as a low blanket of flame on the outer surface of the burner screen 15, and the spacing of the radiant screen 17 outwardly therefrom is such that the flame does not actually impinge on the latter. It will be noted that the channel formations, including the flanges 13, which support the paired port and burner screens extend appreciably beyond the burner screen 15 and form baffles along the longitudinal edges of the same. Such channel supports, the clamp bars 16, and the outer radiant screen 17 serve to enclose the burner screen and thus to confine the heat thereof and shield the flame from inflow of relatively cool ambient air.

Testing has indicated that the working temperature of a burner constructed as disclosed is below 2000° F. and about 1650° F. It has been found that the fine mesh port screen 14 does not get hot enough to glow, while the burner screen 15 exhibits a cherry red and the radiant screen 17 a dull red color. The use of a relatively coarse screen of heavier wire for the burner screen extends the useful life of the same and, because the several screens are transversely curved, rigid attachment can be used for the same without any problem of distortion due to expansion and contraction. That is, the use of curved screens as set forth provides for directionally "controlled" expansion and has been demonstrated completely to eliminate any need for flexible or other special mountings as employed with flat screens to eliminate warping and buckling thereof upon thermal expansion.

It will be understood that the size of the new burner may vary, with the dimensions thereof directly related to the input to maintain the stated mode of operation, and burners of different sizes have in fact been constructed and successfully tested. The burner illustrated is one of the larger ones, with a length on the order of seventeen inches and a rating of 6640 B.t.u. per hour. In a smaller burner, the inner gas distributor tube found desirable for the larger sizes can be omitted, with the smaller burner body of course supplied through an injection or mixing tube as described herein.

The generally elongated form of the disclosed burner suits the device for use as a broiler burner in a gas cooking range and has been successfully applied to such use. In one such embodiment considered, two of the burners are employed in spaced parallel relation, in this case in a separate broiler compartment in a range extending substantially the full vertical extent of the same. It will, however, be clear that the new burner can as well be applied to other space heating environments, which may or may not call for a change in size and general form. It is important that the screens, regardless of the body shape, be curved for the noted directional control of expansion and also that the physical and functional relationships of the several screens as disclosed be provided for operation in the preferred manner.

Other modes of applying the principle of the invention may be employed, change being made as regards the details described, provided the features stated in any of the following claims or the equivalent of such be employed.

We, therefore, particularly point out and distinctly claim as our invention:

A radiant screen burner comprising a chambered body adapted to receive gaseous fuel and having a slot for passage of such fuel therefrom, a rectangular transversely curved port screen disposed over the body slot, a transversely curved burner screen uniformly overlying the outer face of said port screen, said burner screen being of coarser mesh than said port screen, a transversely curved radiant screen in outward spaced and concentric relation to the burner screen, said radiant screen being of coarser mesh than said burner screen, the transverse curvature of said screens permitting directionally controlled expansion thereof upon being heated, and means for rigidly securing the thus disposed screens to the body, said securing means comprising portions of said body adjacent said slot forming longitudinally extending channels for supporting said port and burner screens, and outwardly spaced clamping bars secured to said body portions, said clamping bars respectively defining concentric longitudinal channels for supporting said radiant screen.

References Cited in the file of this patent

UNITED STATES PATENTS

| | | |
|---|---|---|
| 824,361 | Hudson | June 26, 1906 |
| 1,545,605 | Rusch | July 14, 1925 |
| 3,029,866 | Henger | Apr. 17, 1962 |
| 3,040,805 | Lambert | June 26, 1962 |

FOREIGN PATENTS

| | | |
|---|---|---|
| 42,777 | France | Aug. 7, 1933 |
| 204,169 | Germany | Nov. 11, 1908 |
| 206,122 | Australia | Feb. 8, 1955 |
| 569,947 | Belgium | Aug. 14, 1958 |
| 732,262 | France | June 14, 1932 |
| 1,108,655 | France | Sept. 7, 1955 |
| 1,129,123 | France | Sept. 3, 1956 |